United States Patent [19]

Allison

[11] 4,022,494
[45] May 10, 1977

[54] MOTOR VEHICLE REAR SUSPENSION SYSTEM

[75] Inventor: William D. Allison, Grosse Pointe Farms, Mich.

[73] Assignee: Ford Motor Company, Dearborn, Mich.

[22] Filed: July 7, 1975

[21] Appl. No.: 593,804

[52] U.S. Cl. .......................... 280/723; 180/73 R; 267/57
[51] Int. Cl.² ........................ B60G 11/20
[58] Field of Search ........... 280/124 R, 124 B, 700, 280/721, 723; 267/57, 154, 20 A; 180/73 R

[56] References Cited

UNITED STATES PATENTS

| | | | |
|---|---|---|---|
| 2,853,310 | 9/1958 | Allison | 267/57 |
| 2,859,976 | 11/1958 | McFarland | 267/57 |
| 2,915,321 | 12/1959 | Wilfert | 280/124 B |
| 3,025,078 | 3/1962 | Allison | 280/124 B |
| 3,029,090 | 4/1962 | Wilfert | 280/124 B |
| 3,171,642 | 3/1965 | Allison | 267/20 |
| 3,202,236 | 8/1965 | Allison | 180/73 |
| 3,259,201 | 7/1966 | Allison | 267/57 |
| 3,284,095 | 11/1966 | Allison | 280/124 B |
| 3,733,087 | 5/1973 | Allison | 280/124 B |
| 3,831,970 | 8/1974 | Müller | 267/57 |
| 3,879,051 | 4/1975 | Kolbe | 280/124 B |

Primary Examiner—Joseph F. Peters, Jr.
Assistant Examiner—John A. Carroll
Attorney, Agent, or Firm—Clifford L. Sadler; Keith L. Zerschling

[57] ABSTRACT

A motor vehicle rear suspension has wheels rotatably supported at the outer ends of an axle that is positioned by a longitudinally extending upper arm and left and right laterally extending suspension arms connected to the vehicle body by compression loaded links. A torsion bar has a transverse portion supported on the vehicle body and longitudinal end portions connected to the laterally extending suspension arms. The bar functions as a main suspension spring for the rear wheels, as a positioning member for the lateral arms and as an anti-roll stabilizer bar.

4 Claims, 4 Drawing Figures

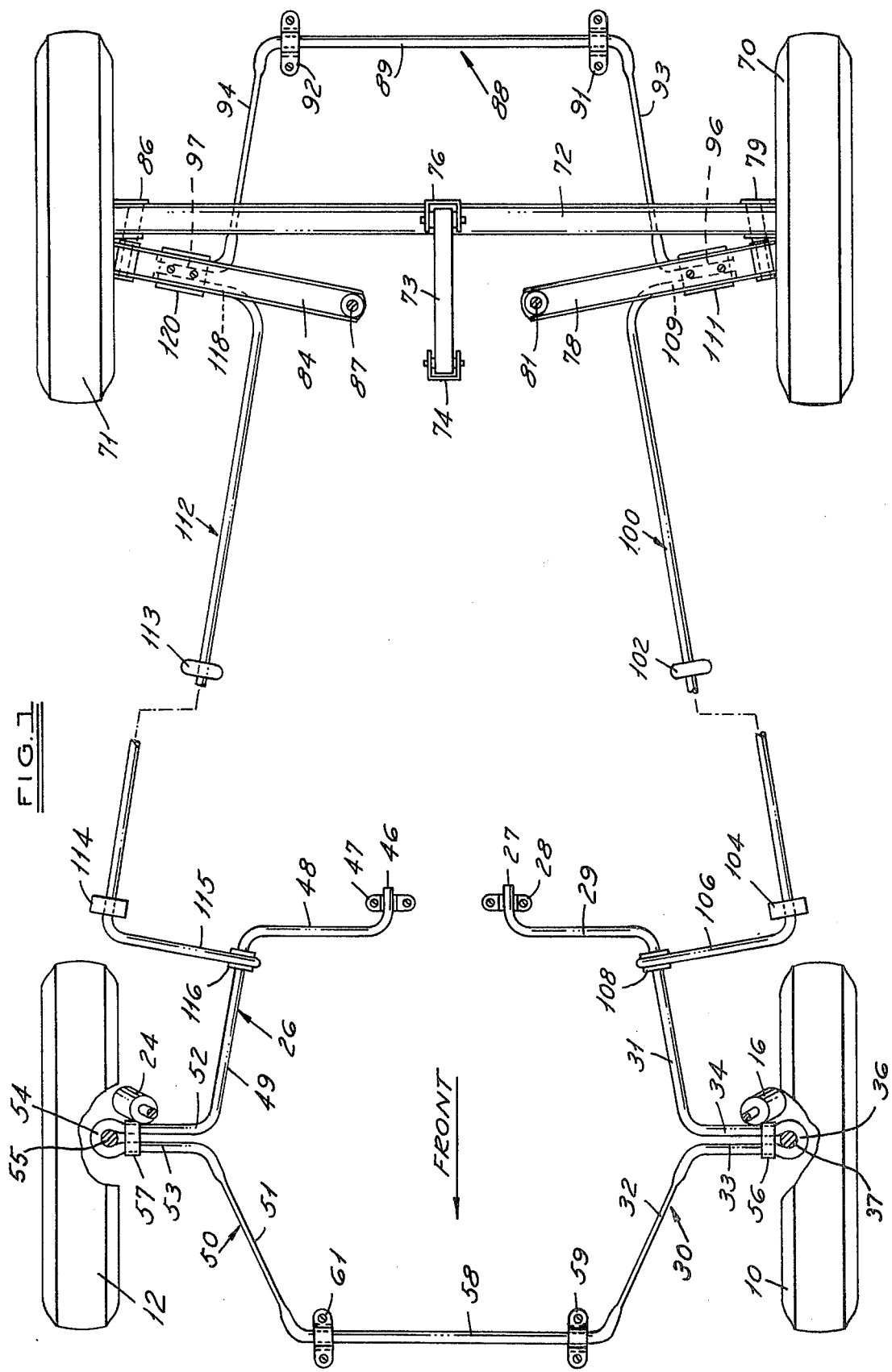

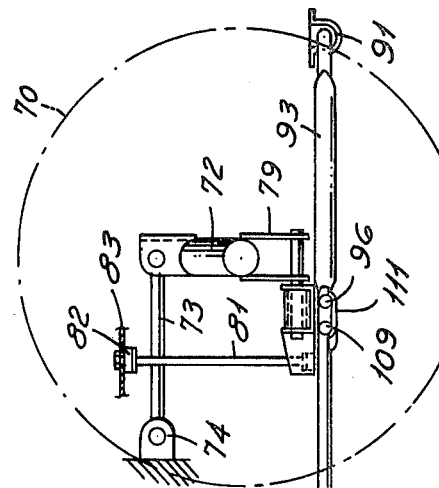
FIG. 3
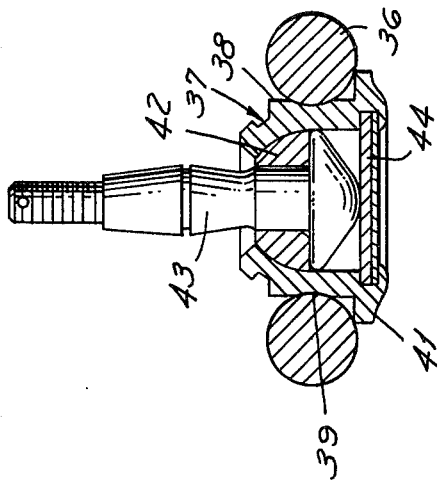
FIG. 4
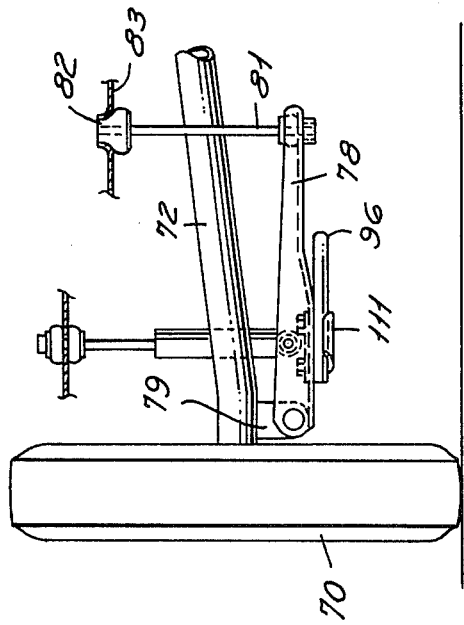
FIG. 2
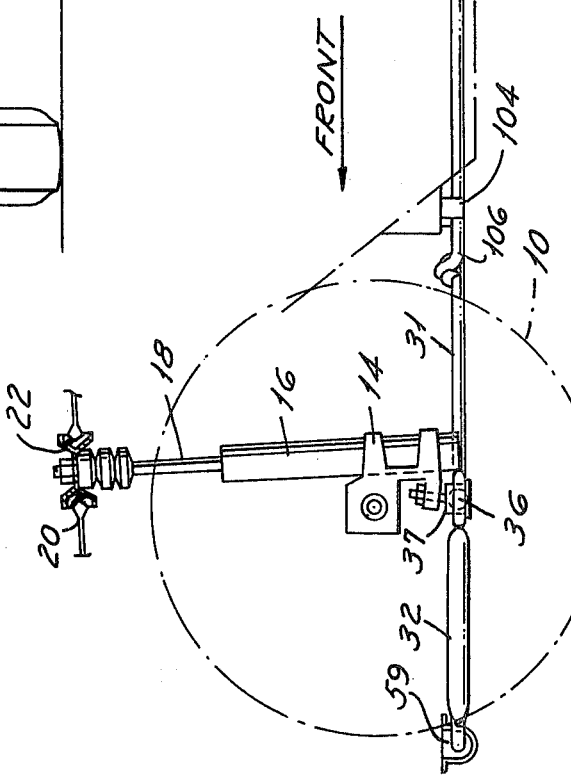

MOTOR VEHICLE REAR SUSPENSION SYSTEM

BACKGROUND OF THE DISCLOSURE

The present invention relates to motor vehicle suspension systems, and more particularly to a rear suspension having a one-piece torsion bar which function as the principal rear suspension spring for the vehicle body, a part of the means locating the rear axle relative to the body and as an anti-roll stabilizer bar.

BRIEF SUMMARY OF THE DISCLOSURE

In the illustrated embodiment of the invention, a rear suspension includes an axle tube with left and right road wheels rotatably supported at its outer ends. A single longitudinally extending suspension are is connected to the axle. Left and right laterally extending suspension arms are pivotally connected at their outer ends to the axle. Articualted shackles connect the inner ends of the arms to the vehicle frame. The rear suspension spring means comprises a one-piece torsion bar having a transverse portion supported on the vehicle frame by spaced resilient mounts located rearwardly of the axle. Longitudinally extending torsion bar portions are connected to the left and right rear suspension arms.

The torsion bar functions as the principal rear suspension spring for the vehicle body, a part of the means locating the rear axle relative to the body and as the rear anti-roll stabilizer bar.

Also disclosed is a front suspension which includes left and right road wheels that are rotatably supported on wheel support members which, in turn, are rigidly secured to left and right telescopic shock absorber struts. A single torsion bar spring has a right portion of generally Y-shape that is supported on the vehicle frame and is connected to the right wheel support member. The same torsion bar has a left portion of Y-shape supported on the vehicle frame and connected to the left wheel support member. Each of the left and right Y-shape portions is supported on the vehicle frame by a pair of fore and aft resilient mounts. The front torsion bar functions as the left and right wheel positioning members, as the left and right main suspension springs and as an anti-roll stabilizer bar.

Left and right longitudinally extending torsion bars are supported on the vehicle frame and interconnect the front and rear suspensions. The longitudinal bars have inwardly angled load lever arm portions connected to the left and right Y-shape portions of the front torsion bar. The rearward ends of the longitudinal bars have outwardly turned load lever arm portions that are clamped to the rear suspension arms.

The suspension system according to this invention is characterized by its simplicity of construction and its superior operation. The rear torsion bar suspension according to this invention is inexpensive to construct and provides superior ride and handling characteristics. It is particularly well suited to a light-weight vehicle.

BRIEF DESCRIPTION OF THE DRAWINGS

The many objects and advantages of a motor vehicle suspension system constructed in accordance with this invention will become apparent upon consideration of the following detailed discussion and the accompanying drawings, in which:

FIG. 1 is a top plan view of a vehicle suspension in accordance with the present invention;

FIG. 2 is a side elevational view of the suspension of FIG. 1;

FIG. 3 is a sectional view through the connection between the front torsion bar and one of the front ball joints; and FIG. 4 is a rear elevational view of the left side of the rear suspension.

DETAILED DESCRIPTION OF A PREFERRED EMBODIMENT

Referring now to the drawings wherein the presently preferred embodiment of this invention is illustrated, FIG. 1 shows a top plan view of a motor vehicle suspension. Left and right front road wheels 10 and 12 are rotatably supported on left and right wheel supporting members, the left one of which is shown in FIG. 2 and identified by reference numeral 14.

A left telescopic shock absorber strut 16 has its lower end rigidly secured to the left wheel support member 14. A piston rod 18 extends upwardly from the strut and has its upper end secured to vehicle body structure 20 by means of the resilient mounting device 22. In a similar fashion, right telescopic suspension struts 24 has its lower end rigidly secured to the right wheel support member and its piston rod resiliently connected to vehicle body structure.

A single one-piece continuous torsion bar spring 26 interconnects the left and right front wheel support members. The torsion bar 26 has a left end 27 that is pivotally supported by bracket 28 that contains a resilient bushing. The bar end 27 extends in a generally longitudinal direction. A transversely extending portion 29 of the bar 26 connects the bar end 27 to one leg 31 of a generally Y-shape portion 30 of the bar. Other elements of the Y-shaped bar portion 30 include a diagonally arranged strut 32 and parallel laterally extending bar portions 33 and 34. A loop 36 interconnects the outer ends of the laterally extending bar portions 33 and 34.

Refering to FIG. 3, a ball joint 37 has its socket 38 secured in the loop 36 by means of a press fit. The socket 38 has an annular surface groove 39 in which the bar loop 36 is seated. A ledge 41 is formed on the socket 38 and the loop 36 rests against the ledge 41. Within the socket 38, an annular bearing 42 is pivotally supported and surrounds the shank of a ball stud 43. The head of the stud 43 rests against the bearing 42 and against a closure plate 44 which is retained by a crimped over edge of the socket 38. The shank of the ball stud 43 is secured to the left wheel support member 14.

The torsion bar 26 has a short longitudinally extending portion 46 at its right end that is pivotally supported in a body mounted bracket 47. The bracket 47 contains a resilient bushing and constitutes a pivotal support for the bar end 46.

A laterally extending bar portion 48 interconnects the end 46 of the bar with a diagonally arranged strut portion 49. Bar portion 49 forms one leg of a Y-shape bar structure 50 at the right side of the vehicle. Other legs of the right Y-shape structure 50 include a diagonally arranged strut portion 51 and a pair of laterally extending bar portions 52 and 53 that terminate in a loop 54.

A ball joint 55 has its socket press-fitted into the loop 54 and its ball stud secured to the right wheel support member. The construction of the ball joint 55 and its attachment to the bar loop 54 is similar to the construction shown in FIG. 3. The left ball joint 37 retained in the left torsion bar loop 36 and the right ball joint 55 retained in the loop 54 may be further secured in position by reinforcing straps 56 and 57.

The diagonal strut portion 32 of the left Y-shape bar structure 30 is connected to the strut 51 of the right Y-shaped structure 50 by an interconnecting transverse bar portion 58 which is journalled on the vehicle body by a pair of resilient bushings and supporting brackets 59 and 61.

The left and right Y-shaped portions 30 and 50 of the torsion bar 26 function as left and right wheel positioning members. The bar 26 also functions as a main suspension spring supporting the sprung mass at the front of the vehicle on the left and right road wheels 10 and 12. The bar 26 is preformed during manufacture so that it will support the vehicle body at its proper design height. Finally, the bar 26 serves as an anti-roll stabilizer bar. All of these functions are performed by the bar 26 which is of one-piece continuous construction.

The rear suspension comprises left and right rear wheels 70 and 71 which are rotatably supported at the outer ends of the axle 72. A longitudinally extending upper arm 73 has its forward end pivotally connected to a bracket 74 that is supported on the body of the vehicle. The rearward end of the upper arm 73 is pivotally connected to a bracket 76 welded to the axle 72.

Referring to FIG. 4, a left laterally extending suspension arm 78 has its outer end pivotally connected to a bracket 79 that is welded to the axle 72 adjacent the left wheel 70. A link 81 has its lower end pivotally connected to the inner end of the left arm 78. The upper end of the link 81 is pivotally connected by a pivot structure 82 to the vehicle body structure 83.

A right laterally extending suspension arm 84 is similarly constructed and arranged. The outer end of the right arm 84 is pivotally connected to a bracket 86 welded to the axle 72 adjacent the wheel 71. The inner end of the right arm 84 is connected to the vehicle body by a link 87.

A rear one-piece torsion bar 88 has a transversely extending midportion 89 that is journalled at its outer ends on the vehicle body by left and right bushings 91 and 92. Longitudinally extending portions 93 and 94 of the bar 88 extend forwardly from the ends of the transverse bar portion 89. The forward ends of the bar 88 are bent outwardly to form load lever arms 96 and 97.

The rear torsion bar 88 is a multi-purpose constituent of the rear suspension system. It serves as a main suspension spring for the left and right wheels 70 and 71. It is preformed so that when it is installed in the vehicle, the body will be at the proper height above the ground. Its longitudinally extending portions 93 and 94 serve as wheel positioning members connected to the suspension arms 78 and 84. Finally, the torsion bar 88 serves as an anti-roll stabilizer. Body roll about the longitudinal roll axis of the vehicle will be resisted by the torsional loading of the bar 88.

A left longitudinally extending torsion bar 100 interconnects the front and rear suspension. The left bar 100 is supported on the vehicle body by support brackets or bushings 102 and 104. The bar 100 is bent inwardly at its forward ends to form a load lever arm 106. The end of the lever arm portion 106 rests upon the strut portion 31 of the front torsion bar 36. A resilient pad 108 is interposed between the torsin bar portion 31 and the end of the lever arm 106 which has a small curve that forms a shallow hook.

The rearward end of the left torsion bar 100 is bent outwardly to form a load lever arm 109. The lever arm 109 and the angled end 96 of the rear bar 88 are secured to the left rear suspension arm 78 by means of a clamp 111 and a pair of bolts.

Similarly, a longtiudinally extending torsion bar 112 is provided. The right torsion bar 112 is journalled on the vehicle body by support brackets 113 and 114. The forward end of the bar 112 is bent inwardly to form a load lever arm 115. The inner end of the lever arm portion 115 is formed with a slight hook to complement the configuration of the right rear strut portion 48 of bar 26 which it engages. A resilient pad 116 is interposed between the end of the lever arm 115 and the portion 48 of the front torsion bar 26.

At the rear end of the right torsion bar 112, the bar is angled outwardly to form a load lever arm 118. Lever arms 118 and 97 of bars 112 and 88 are clamped to the right suspension are 84 by means of a bracket 120 and a pair of bolts.

OPERATION

The vehicle suspension of this invention operates in the following manner. The front bar 26 is preformed so that it resiliently supports the front portion of the vehicle body at its proper design height upon the left and right wheel support members and the wheels 10 and 12. When one of the wheels 10 or 12 passes over an obstacle in the road and moves upwardly in jounce, the bar 26 will flex and the wheel movement will be resiliently resisted.

In addition to supporting the body, the multi-purpose front torsion bar 26 functions to position the left and right road wheels 10 and 12 during jounce and rebound movement. The left wheel 10 will swing about an axis extending through the brackets 28 and 59. The left portion 30 of the bar 26 between the brackets 28, 59 and the ball joint 37 constitutes a wheel positioning member. Similarly, the right wheel 12 will pivot about an axis extending through the brackets 47 and 61 and the portion 50 of the bar outwardly of these brackets constitutes a wheel positioning member. The portions 30 and 50 of the bar 26 functions in a manner comparable to that of suspension arms. They position the wheels 19 and 12 both laterally and longitudinally in the vehicle body. The bar portions 31, 32 and 49, 51 functions as drag struts for the left and right wheel support members.

When the vehicle body rolls about a longitudinal axis, the torsion bar 26 will be loaded in a manner to resist such movement. Thus, the bar 26 constitutes an anti-roll stabilizer.

In the rear suspension, the torsion bar 88 is preformed so that it resiliently supports the rear portion of the vehicle body upon the suspension arms 78 and 84. The bar portions 93 and 94 that extend in a longitudinal direction function to position the left and right rear suspension arms 78 and 84. The loading imposed by the bar 88 upon the suspension arms 78, 84 in supporting the vehicle body will load the links 81 and 87 in compression. The bar 88 will be loaded in torsion to support the vehicle body load. The torsional loading of the bar 88 will increase when one of the wheels 70 or 71 passes over a road obstacle and moves in a jounce direction whereby the bar will resiliently resist such movement.

The torsion bar 88 and its portions 93 and 94 connected to the arms 78 and 84 will serve to locate the arms and the axle 72 both longitudinally and laterally. The longitudinal bars 100 and 112 which are also connected to the arms 78 and 84, assist in locating the suspension arms 78, 84 and the axle 72.

The longitudinally extending bars 100 and 112 interconnect the front and rear suspensions and serve to distribute suspension loads between the front and rear wheels. Assuming the front wheel 10 passes over an object and moves upwardly in jounce, the portion of the torsion bar 26 outwardly of the brackets 28 and 59 will move upwardly in the manner of a suspension arm. This movement will be transmitted to the lever arm 106 of the left longitudinal bar 100 and through the bar 100 to the lever arm end 109 and the left rear suspension arm 78 connected thereto. Thus, when the wheel 10 moves upwardly the front bar 26 will be deflected to resiliently resist such movement. In addition, the longitudinal torsion bar 100 will be twisted whereby it also will resiliently resist wheel jounce. The forces in the bar 100 will be anchored by the left rear suspension arm 78 which is connected by the bracket 78 to the road wheel 70.

As a further example, if the right rear wheel 71 moves upwardly in jounce, the arm 84 will pivot counterclockwise (when viewed from the rear). The bar 88, being clamped to the arm 84, will be twisted and will resiliently resist such movement of the wheel 71. In addition, the longitudinal bar 112 being clamped to the arm 84 will also be twisted and will further resist movement of the wheel 71 as well. The load in the longitudinal bar 112 imposed by the jounce movement of the wheel 71 will be transmitted through the bar 112 and lever arm 115 into the front torsion spring 26 which is anchored to the right front wheel 12. The brackets 113 and 114 which connect the bar 112 to the vehicle body will serve as reaction members.

SUMMARY

A vehicle suspension according to the present invention is particularly suitable for a lightweight vehicle. It provides superior ride and handling characteristics while being of inexpensive construction. The various torsion bars serve multiple functions and distribute the load through the vehicle so that the spring rates may be lower than would otherwise be possible.

The foregoing description presents the presently preferred embodiment of this invention. Modifications and alterations may occur to those skilled in the art that will come within the scope and spirit of the following claims.

I claim:
1. A motor vehicle suspension system having a vehicle frame;
   left and right wheels rotatably supported by an axle;
   axle positioning means interconnecting said axle and said frame;
   said axle positioning means including left and right laterally extending suspension arms pivotally connected to said axle;
   left and right compression links connecting the inner ends of said left and right suspension arms, respectively, to said vehicle frame;
   a rear torsion bar having a transverse portion supported on said vehicle frame and having longitudinally extending left and right bar portions;
   said left and right portions of said rear torsion bar having load lever arms connected to said left and right suspension arms;
   left and right longitudinally extending torsion bars;
   said left and right bars having their rearward ends connected to said left and right suspension arms;
   said left and right bars extending forwardly of said axle and connected to said vehicle frame;
   a longitudinally extending suspension arm pivotally connected to said frame and said axle.

2. A motor vehicle suspension system according to claim 1 and including:
   said transverse portion of said rear torsion bar being disposed rearwardly of said axle.

3. A motor vehicle suspension system having a vehicle frame;
   left and right wheels rotatably supported by a transversely extending rigid axle;
   axle positioning means interconnecting said axle and said frame;
   said axle positioning means including left and right laterally extending suspension arms;
   left and right brackets rigidly secured to said axle;
   left and right pivot means pivotally connecting said left and right suspension arms, respectively, to said left and right brackets;
   left and right compression links having lower ends pivotally connected to the inner ends of said left and right suspension arms and upper ends pivotally connected to said vehicle frame;
   a rear one-piece torsion bar having a transverse portion supported on said vehicle frame and having longitudinally extending left and right bar portions;
   said left and right portions of said rear torsion bar having load lever arms secured to said left and right suspension arms;
   said rear torsion bar being constructed to resiliently support a substantial portion of the mass of said vehicle frame on said left and right suspension arms and said axle;
   said left and right portions of said rear torsion bar being constructed to position said left and right suspension arms and said axle longitudinally with respect to said vehicle frame;
   a longitudinally extending suspension arm pivotally connected to said frame and said axle.

4. A motor vehicle suspension system having a vehicle frame;
   left and right wheels rotatably supported by a transversely extending rigid axle;
   axle positioning means interconnecting said axle and said frame;
   said axle positioning means including left and right laterally extending suspension arms;
   left and right brackets rigidly secured to said axle;
   left and right pivot means pivotally connecting said left and right suspension arms, respectively, to said left and right brackets;
   left and right compression links having lower ends pivotally connected to the inner ends of said left and right suspension arms and upper ends pivotally connected to said vehicle frame;
   a rear one-piece torsion bar having a transverse portion supported on said vehicle frame and having longitudinally extending left and right bar portions;
   said transverse portion of said rear torsion bar being disposed rearwardly of said axle;
   said left and right portions of said rear torsion bar having load lever arms;
   said rear torsion bar being constructed to resiliently support a substantial portion of the mass of said vehicle frame on said left and right suspension arms and said axle;

said left and right portions of said rear torsion bar being constructed to position said left and right suspension arms and said axle longitudinally with respect to said vehicle frame;

left and right longitudinally torsion bars extending forwardly from said left and right suspension arms;

said left and right longitudinal bars each having a load lever arm at its rearward end;

said lever arms of said left longitudinal bar being disposed adjacent said lever arm of said left portion of said rear torsion bar and left securing means securing said adjacent lever arms to said left suspension arm;

said lever arm of said right longitudinal bar being disposed adjacent said lever arm of said right portion of said rear torsion bar and right securing means securing said adjacent lever arms to said right suspension arm;

a longitudinally extending suspension arm pivotally connected to said frame and said axle.

* * * * *